March 3, 1964    R. FAGEL    3,123,729
STATORS FOR ELECTRIC MOTORS AND GENERATORS
Filed Dec. 1, 1960    2 Sheets-Sheet 1

INVENTOR
Roger FAGEL
BY
ATTORNEYS

March 3, 1964  R. FAGEL  3,123,729
STATORS FOR ELECTRIC MOTORS AND GENERATORS
Filed Dec. 1, 1960  2 Sheets-Sheet 2

INVENTOR
Roger FAGEL
BY
ATTORNEYS

United States Patent Office 3,123,729
Patented Mar. 3, 1964

3,123,729
STATORS FOR ELECTRIC MOTORS AND GENERATORS
Roger Fagel, Marcinelle, Belgium, assignor to Ateliers de Constructions Electriques de Charleroi, Brussels, Belgium
Filed Dec. 1, 1960, Ser. No. 73,125
3 Claims. (Cl. 310—43)

The present invention relates to stators for electric motors and generators, and consists of improved stator end plates for clamping the stator laminations, characterised in that the end plate is constituted by a hollow member made of conductive material, surrounding the extremities of the stator winding conductors and acting as a short-circuit ring for reducing the leakage of magnetic flux.

Preferably, the hollow member or annular parts integral therewith will extend as far as the extremities of the stator winding and form a compact mechanical assembly with the stator conductors by the interposition of a cast and hardened insulator, in which the conductors are embedded, this insulator being supported upon the internal walls of the hollow member.

The hollow member may comprise channels for circulation of a cooling fluid, and it may be made for example of cast aluminium.

The hollow member may serve moreover as support for a ring of connectors through which the current is led to the stator conductors, these connectors serving also for the interconnection of the windings, and being made before the insulator is cast in place.

Figure 1:
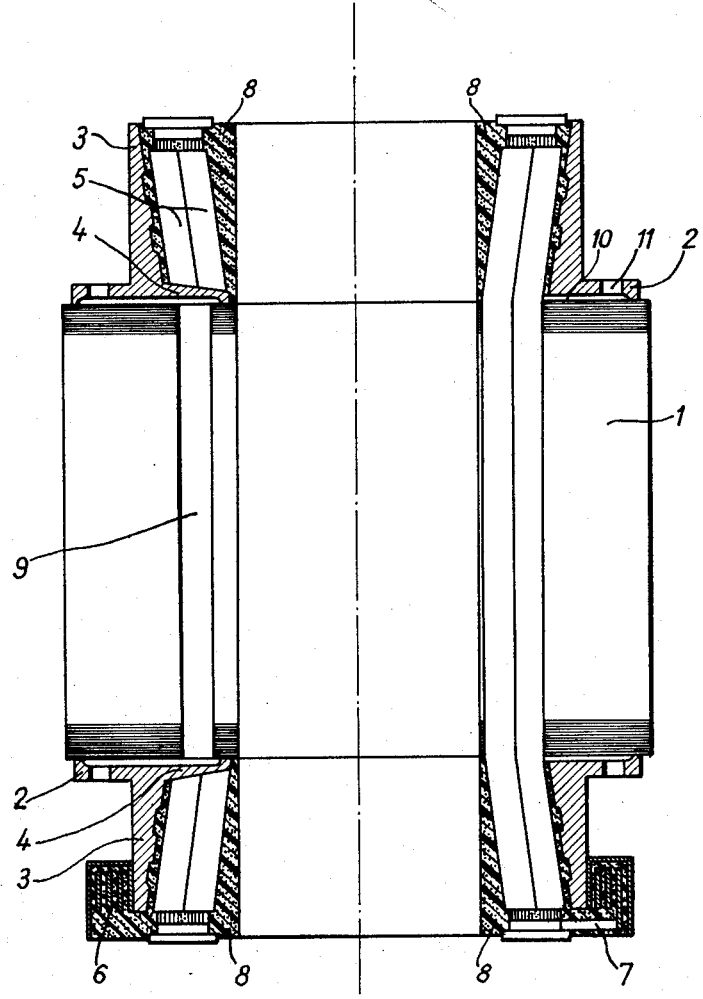
Figure 2:
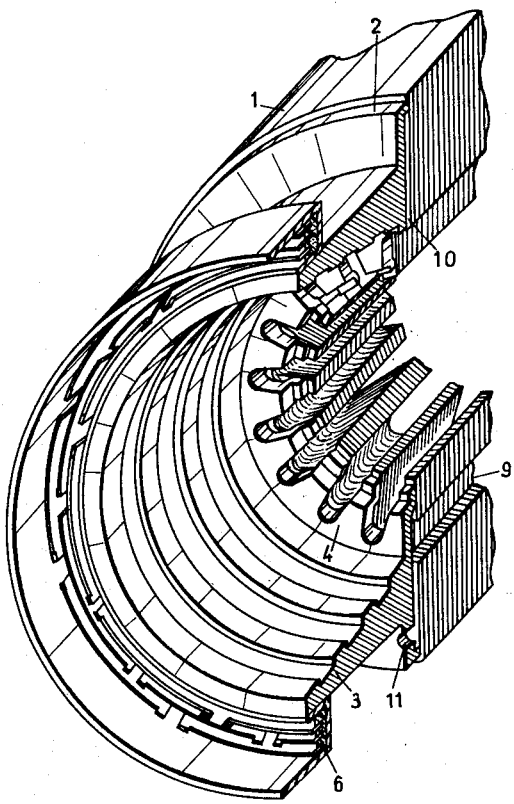

The invention is hereinafter described with reference to a non-limitative example of embodiment, represented in the accompanying drawings FIG. 1 is a part-sectional elevation of the stator and FIG. 2 is a sectional perspective view of the assembly without the windings.

In these drawings, the two end-clamping plates of the stator are shown in section at the respective ends of the stator 1; each plate consists of a hollow member comprising an annular base or flange 2, an extension 3 having more or less the shape of a hollow cylinder, and a comb with radial teeth 4, extending in the opposite direction to the flange 2, inwardly of the conductors 5 located in the stator's slots.

Upon the extremity of the extension 3 of the clamping plate at one end of the stator, there is applied a connector ring 6, the connections of which have been established before the ring 6 is fixed upon the extension 3. After the mounting of the ring 6 upon the hollow member, only the bar conductors 7 have to be brazed to the stator conductors.

The stator conductors 5, preferably forming bundles, and the conductors disposed in the connector ring 6 are embedded in a cast and hardened insulator 8, for example of sythetic plastic or resin to form a mechanical assembly supported upon the internal walls of the extensions 3 of the hollow members.

For this purpose the internal walls of the extensions 3 comprise anchorage grooves, in which the insulator 8 will become keyed. Preferably, the same insulator 8 also forms the slot wedges of the stator, and the involutes of the stator windings become embedded therein.

The stator may comprise cooling channels 9 for circulation of air, oil or other fluid, in which case the hollow member will also comprise radial channels 10 communicating with the exterior of the stator by apertures 11 provided for example in the annular base or flange 2.

What I claim and desire to secure by Letters Patent is:
1. An end structure for a rotary electric machine having stator laminations, said structure comprising: an endplate for clamping the stator laminations of said machine; said end plate being formed of conductive material and including a substantially cylindrical part and radial teeth extending inwardly of said cylindrical part at one end thereof and adapted to lie over said stator laminations; stator conductors having extremities extending between said teeth and distributed around the inner surface of said cylindrical part; anchoring means on the inner surface of said part; insulating plastic material cast around said inner surface, so as to completely embed the extremities of said conductors, and integrated to said inner surface through said anchoring means whereby said end plate, stator conductor and plastic material form an integrated end structure.

2. An end structure as claimed in claim 1, including a channel-shaped connector ring outwardly mounted on said cylindrical part at the end thereof away from said flanged end; conducting elements for joining said ring to adjacent extremities of stator conductors; said conducting elements being also embedded in said insulating material.

3. An end structure as claimed in claim 1 including a channel on the lamination abutting surface of said radial flange adapted to communicate with cooling passages in said laminations.

References Cited in the file of this patent
UNITED STATES PATENTS
2,920,218  Beckwith _____ Jan. 5, 1960
2,975,309  Seidner _____ Mar. 14, 1961